United States Patent
Busceme et al.

(10) Patent No.: US 10,894,912 B2
(45) Date of Patent: Jan. 19, 2021

(54) METHODS AND COMPOSITIONS FOR USING TEMPORARY COMPACTED MATERIALS AS WELL SERVICING FLUIDS IN A SUBTERRANEAN FORMATION

(71) Applicant: LYONDELLBASELL ADVANCED POLYMERS INC., Houston, TX (US)

(72) Inventors: Charles J. Busceme, Sour Lake, TX (US); Bradley L. Todd, Duncan, OK (US); Stanley J. Heath, Duncan, OK (US)

(73) Assignee: LyondellBasell Advanced Polymers Inc., Houston, TX (US)

( * ) Notice: Subject to any disclaimer, the term of this patent is extended or adjusted under 35 U.S.C. 154(b) by 131 days.

(21) Appl. No.: 15/884,955

(22) Filed: Jan. 31, 2018

(65) Prior Publication Data
US 2018/0155606 A1    Jun. 7, 2018

Related U.S. Application Data

(62) Division of application No. 14/196,451, filed on Mar. 4, 2014, now Pat. No. 9,914,868.

(51) Int. Cl.
| | | |
|---|---|---|
| C09K 8/506 | (2006.01) | |
| C09K 8/516 | (2006.01) | |
| C09K 8/44 | (2006.01) | |

(52) U.S. Cl.
CPC ............... *C09K 8/506* (2013.01); *C09K 8/44* (2013.01); *C09K 8/516* (2013.01)

(58) Field of Classification Search
CPC ........... C09K 8/506; C09K 8/44; C09K 8/516
See application file for complete search history.

(56) References Cited

U.S. PATENT DOCUMENTS

| | | | |
|---|---|---|---|
| 3,098,094 A | 7/1963 | Pitchford | |
| 3,826,310 A | 7/1974 | Karnes | |
| 4,366,074 A | 12/1982 | McLaughlin et al. | |
| 6,192,986 B1 | 2/2001 | Urlwin-Smith | |
| 7,205,264 B2 | 4/2007 | Boles | |
| 7,520,327 B2 | 4/2009 | Surjaatmadja | |
| 7,786,051 B2 | 8/2010 | Lange et al. | |
| 8,622,134 B2 | 1/2014 | Pauls et al. | |
| 2010/0200235 A1* | 8/2010 | Luo | C09K 8/50 166/284 |
| 2011/0226479 A1 | 9/2011 | Tippel et al. | |
| 2012/0043256 A1 | 2/2012 | Kremer et al. | |
| 2012/0190596 A1 | 7/2012 | Huang | |

OTHER PUBLICATIONS

Diane S. Roote, P.G. "In Situ Flushing", Technology Overview Report Ground-Water Remediation Technologies Analysis Center, Jun. 1997, 24 pages.

(Continued)

*Primary Examiner* — Aiqun Li

(57) ABSTRACT

Provided is a method of treating a subterranean formation comprising: preparing a well servicing fluid comprised of a base fluid, a temporary compacted material wherein the temporary compacted material is a compacted organic acid; placing the well servicing fluid into a subterranean formation; and allowing the temporary compacted material to gradually dissolve.

18 Claims, 3 Drawing Sheets

(56) References Cited

OTHER PUBLICATIONS

RPMinerals, "RPMinerals Drilling Fluid Additives", 8 page products brochure; 2012.
USPTO RR dated Jun. 12, 2015 in connection with U.S. Appl. No. 14/196,451.
USPTO NFOA dated Aug. 5, 2015 in connection with U.S. Appl. No. 14/196,451.
USPTO FOA dated Dec. 9, 2015 in connection with U.S. Appl. No. 14/196,451.
USPTO AA dated Jan. 22, 2016 in connection with U.S. Appl. No. 14/196,451.
USPTO NFOA dated Apr. 19, 2016 in connection with U.S. Appl. No. 14/196,451.
USPTO FOA dated Aug. 3, 2016 in connection with U.S. Appl. No. 14/196,451.
USPTO AA dated Dec. 28, 2016 in connection with U.S. Appl. No. 14/196,451.
USPTO NFOA dated Mar. 3, 2017 in connection with U.S. Appl. No. 14/196,451.
USPTO FOA dated May 22, 2017 in connection with U.S. Appl. No. 14/196,451.
USPTO AA dated Nov. 16, 2017 in connection with U.S. Appl. No. 14/196,451.
USPTO NOA dated Dec. 12, 2017 in connection with U.S. Appl. No. 14/196,451.

\* cited by examiner

120 °F Degradation Tests
Benzoic Acid with Sodium Borate

| Adipic | | Benzoic | |
|---|---|---|---|
| 10 | 14.4 | 10 | 2.1 |
| 25 | 24 | 20 | 2.9 |
| 100 | 1600 | 25 | 3.4 |
| | | 30 | 4.2 |
| | | 40 | 6 |
| | | 50 | 9.5 |
| | | 60 | 12 |
| | | 70 | 17.7 |
| | | 80 | 27.5 |
| | | 90 | 45.4 |
| | | 95 | 68 |

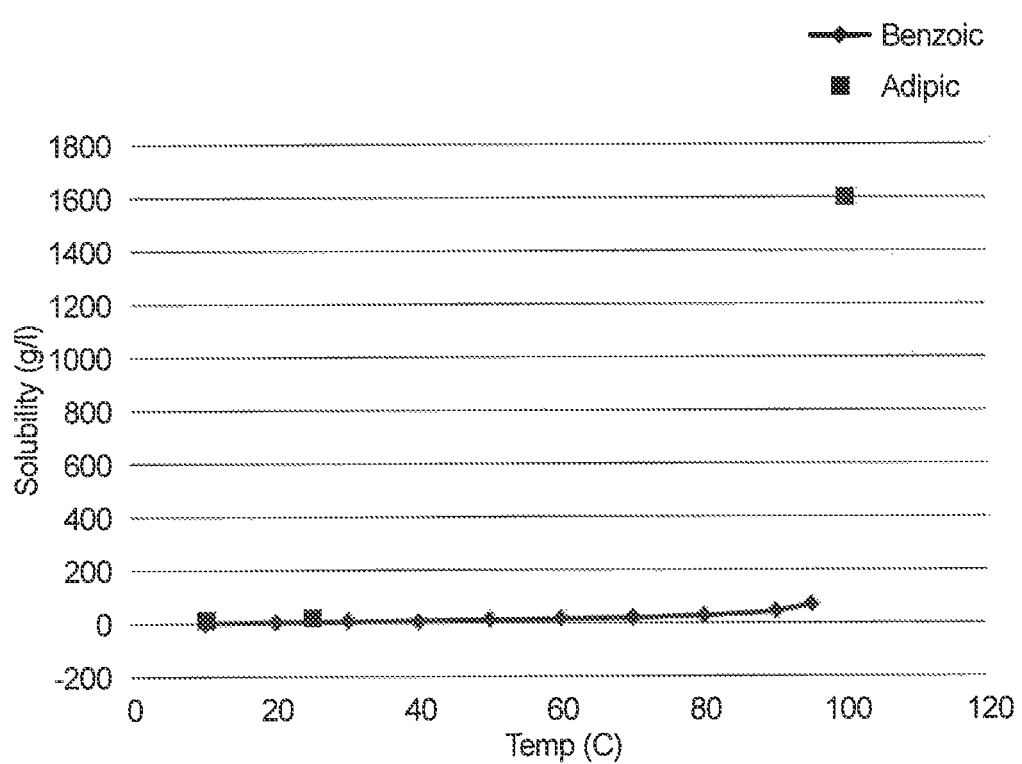

US 10,894,912 B2

METHODS AND COMPOSITIONS FOR USING TEMPORARY COMPACTED MATERIALS AS WELL SERVICING FLUIDS IN A SUBTERRANEAN FORMATION

FIELD OF THE INVENTION

The present invention relates to methods and compositions of using an oil, gas, water or injection well servicing fluid in subterranean formations. More specifically, the present invention relates to methods and compositions of using servicing fluids in drilling, workover, completion, stimulation or treatment fluid comprising a temporary compacted material in an oil, gas, water or injection well contacting a subterranean formation wherein a temporary compacted material is suitable for influencing the movement of fluids in a subterranean wellbore or formation.

BACKGROUND OF THE INVENTION

In the oil and gas industry, water well and injector well industry, boreholes are drilled into subterranean formation that are capable of the flow of fluids through the formation. The flow may be through the permeability of the formation, through vugs or pore spaces, through natural or manmade fractures. Additional flow paths may also exist such as an open hole wellbore, casing, perforation tunnels, slots, tubing, annuli, washouts, particulate packs, screens and completion/service/workover equipment.

While during the producing (or injecting) phase of a well it is generally desired to be as free flowing as possible or at a rate set by the design of the well. However, during the drilling, completion or workover phases of the well it may be desired to allow flow of fluids into only a portion of the formation or wellbore while preventing it from flowing into other portions. In many cases, particulate material has been employed to bridge or seal those flow paths wherein the flow of fluids is undesirable. Although a large number of materials have been used historically for this purpose, they can generally be classified as permanent, removable or temporary.

The action of the particulate material may be described in a number of ways. Terms such as bridging, sealing, plugging, filtercake forming, diverting, fluid loss, lost circulation, permeability modification, packing and coating have commonly been used in the literature.

Examples of permanent materials used are sand, clays, barite and a number of waste stream materials such as fly ash. Although these materials function to control fluid loss at the time of use, they may have severe residual effect on the production or injection of the well later on.

An example of a removable material is calcium carbonate. At some point, a cleanup solution such as acid in placed in contact with the calcium carbonate to remove it from flow paths.

Examples of temporary materials are those that degrade, decompose or have gradual solubility in the wellbore fluid. Biodegradable polymers such as polylactic acid are commonly used since they degrade in the presents of even a small amount of water. However, these polymers may have temperature and cost limitation for many wellbore applications.

SUMMARY OF THE INVENTION

The current invention provides methods and compositions of using well servicing fluids containing compacted materials in subterranean formations. The subterranean formation may be an oil, gas or water injection well. The methods and compositions make use of compacted organic acids, which may comprise a dissolution aide, as temporary blocking agents in subterranean formations.

More particularly, the present invention provides improved methods and compositions of servicing fluids comprising temporary compacted material. The method of servicing a wellbore comprises of a base fluid and a temporary compacted material wherein the temporary compacted material is a substantially compacted organic acid. Organic acids such as benzoic acid are known for use as temporary material in the servicing of subterranean formations in the form of a powders or flakes. However, such powder and flake forms have the disadvantage of being too soft, too friable or having an undesirable solubility rate. Such compositions are also too small to be used in many well servicing applications where a larger, harder particle is needed. In accordance with the present invention by highly compressing an organic acid powder in a suitable press at pressure, for example, of up to 1000's of psi or higher as the case may be, a larger, harder particle is prepared which advantageously performs better when used in servicing fluids. When compacted to a substantially hard particle, the solubility rate of an organic acid can be greatly altered, usually by causing the particles to be much slower to dissolve. Suitable materials can be added to the compacted organic solid particles that can cause a further change in solubility rates as desired. Such compacted particulate matter may be dispersed in carrying fluids that may further comprise any number of other additives commonly used in drilling and servicing fluids.

The current invention also provides for servicing fluids that comprise a temporary compacted material where the temporary compacted material comprises a compacted organic acid, and which compacted material is sized as desired to bridge or seal features of the formation, such as pore throats or fractures, or to plug flow paths, that are natural or manmade as contemplated.

The current invention also provides for servicing fluids that comprise a temporary compacted material where the temporary compacted material comprises a compacted organic acid wherein the concentration of the temporary compacted material is advantageously employed as desired such that a bridge or seal is created within a given amount of fluid placement.

The objectives, features and advantages of the present invention will be readily apparent to those skilled in the art upon a reading of the description of preferred embodiments which follows.

BRIEF DESCRIPTION OF THE DRAWINGS

FIG. 3 is a graph showing an example of yet another aspect of the invention in the use of a compacted organic acid in various contemplated wall servicing and treatment.

DESCRIPTION OF PREFERRED EMBODIMENTS

Figure 1:
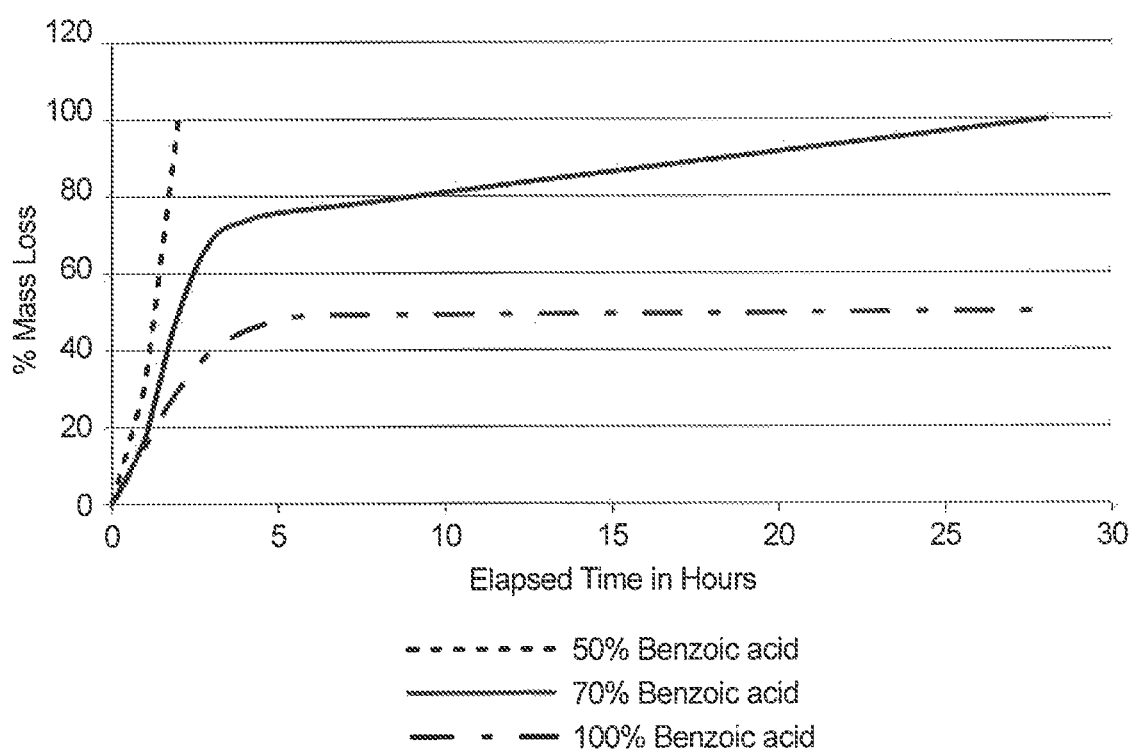
FIG. 1 is a graph showing an example of an advantageous benefit of one aspect of the invention in adjusting the dissolution rate of a compacted organic acid, here benzoic acid, with a dissolution aid, anhydrous sodium borate, useful in various contemplated well servicing and treatment.

The term "subterranean" as used herein means any subterranean operation wherein a fluid may be used, but not limited to, oil and gas drilling operations, hydraulic fracturing treatments, water injection and water flood treatments, sand control treatments (e.g., gravel packing), acidizing treatments (e.g., matrix acidizing or fracture acidizing), well bore clean-out treatments, and other suitable operations where a treatment composition of the present invention may be useful or suitably contemplated.

For down hole use, be it a subterranean formation, for example, in an oil, gas or water injection well being treated as contemplated, the inventive compositions are dispersed in an aqueous medium and are usually made up just prior to down hole injection. The aqueous compositions may be injected into a formation via a producing well or via a secondary injection well, such as for use with a water flood or squeeze technique. While the compositions may be simply injected, such may be forced into a formation by pumping or as thought appropriate. As described below, the compositions may contain other well treatment ingredients and/or other additives as appropriate, and as known in the industry.

As an example of a general scheme in the improved method of applying a well servicing fluid, the method comprises the following steps. First a servicing fluid is prepared using equipment and procedures well known in the art for mixing a base fluid with a particulate material. The servicing fluid comprises a base fluid and a temporary compacted material wherein the temporary compacted material is one or more compacted organic acid. The fluid may additionally comprise any combination of additives commonly used in servicing fluids. Next the fluid is pumped or otherwise conveyed down a wellbore contacting a subterranean formation. The particulate material is allowed to at least partially bridge or seal on a flow path in the wellbore or formation. After the particulate has accomplished the desired control of fluid flow, it is allowed to at least partially dissolve to the point that little residual effect remains on the ability of the well to flow hydrocarbons or water.

A well servicing fluid is any fluid used to drill, workover or treat a subterranean formation. Examples of well servicing fluids include, but are not limited to, drilling fluids, drill-in fluids, completion fluids, gravel pack fluids, fracturing fluids, acidizing fluids, fluid loss control fluids, lost circulation fluids, scale inhibitor treatments, a conformance treatment, well-cleanout fluids, perforating fluid, jetting fluid, packer fluids and workover fluids. The particulates may be used in part of the fluid system or in the entire fluid system.

Organic acids are generally supplied in the form of a powder or flakes. In conventional modes, such particulate forms have been used in the servicing of oil, gas, water and injection wells for decades. Organic acids, such as benzoic acid have the advantage of having limited solubility in a water based servicing fluid, but relatively high solubility in produced oil. As well, organic acids have the additional benefit of having higher solubility in aqueous fluids at higher temperatures. This allows the material to function as a temporary material during placement when wellbore cool down takes place with reduced organic acid solubility, but able to be removed once the wellbore temperature returns to formation temperature. Such powder or flakes forms have found use in applications where the smaller size of the powder is able to seal a permeable rock face or where a pack of the relatively friable flakes can offer enough resistance to flow to be useful, for example, as a diverting material in acid jobs. However, powder particulate form is generally too small and the flakes generally too friable to bridge across natural and manmade fractures, tool slots, larger particle beds, perforations and withhold hundreds, if not thousands of pounds/square inch (PSI) pressure differential. In accordance with the present invention such as up to 1000 PSI or higher as desired it has been found that by compacting the organic acids in a suitable press at very high pressures, a compacted particle is created that is larger than the starting powder or flakes, and which is harder than the starting powder or flakes, and which possesses a highly altered solubility rate as desired and to provide unique advantages which have here before been unexploited in down hole treatment. These compacted particles are also found to bridge across slots, natural or manmade fractures, and withstand a much higher differential pressure not possible with powder or flakes.

The organic acids useful herein may comprise any compactible acidic compound that comprises carbon atoms, with organic acids preferred herein being generally higher molecular weight organic acids which in neutral form are generally water-insoluble, such as, for example, benzoic acid and adipic acid. The acids may be used in one or more combinations with each other and/or one or more salts of organic acids, A "salt" of an acid, as that term is used herein, refers to any compound that shares the same base formulas as the referenced acid, but one of the hydrogen cations thereon is replaced by a different cation (e.g., an antimony, bismuth, potassium sodium, calcium, magnesium, cesium, or zinc cation). Examples of suitable salts of organic acids include, but are not limited to, sodium acetate, sodium formate, calcium acetate, calcium formate, cesium acetate, cesium formate, potassium acetate, potassium formate, magnesium acetate, atimony formate, bismuth acetate, and bismuth formate. The treatment fluids of the present invention may comprise any combination of organic acids contemplated and/or salts thereof. Compactable mixtures of organic acids and organic acid salts may be used in any ratio found desirable, for example, to customize and/or control dissolution rates in certain contemplated conditions. The one or more organic acids (or salts thereof) may be present in the treatment fluids of the present invention in any amount sufficient to provide the desired concentration and/or loading for down hole use or, among other things, the desired temporary blocking, viscosity or other physical attributes as desired.

In some embodiments, the one or more organic acids (or salts thereof) may be present in an amount in the range of from about 0.001% by weight of the treatment fluid to the saturation level of the treatment fluid. In certain embodiments, the one or more organic acids (or salts thereof) may be present in an amount in the range from about 1% by weight of the treatment fluid to the saturation level of the treatment fluid. The amount of the organic acid(s) (or salts thereof) included in a particular compacted material and/or in a particular treatment fluid of the present invention may depend upon the particular acid and/or salt used, as well as other components of the treatment fluid, and/or other factors that will be recognized by one of ordinary skill in the art.

The compaction of a contemplated organic acid in a press can be conducted at a few hundred PSI up to approximately 50,000 PSI. A compaction pressure of approximately 500 PSI will create a particle that is larger and can bridge across slots not possible with the powder or flake form. When much stronger particles are needed to withstand higher forces or pressures, the compaction pressure may be raised into at least a few thousand PSI. Even greater strength particle result when the compaction pressure reach up into the tens of thousands of PSI. One skilled in the art, with knowledge contained in this application will understand how to apply the particles of varying strengths to the desired function of a temporary flow control agent in a subterranean formation.

The size of the particulate material can be chosen such that it will bridge or seal a desired flow path. For natural or manmade fractures, particle sizes of 0.1 to 4 millimeter may be necessary. For sealing on perforation or tool ports, sizes ranging form 0.1 to 1 inch may be necessary. It may also be necessary to mix the compacted particles of the organic acid with smaller particles to cause a more complete seal. One skilled in the art will understand how to use bridging and filtration theory to size the particulates to accomplish the aims and goals of controlling fluid flow in down hole environments encountered during well construction and workover operations. The flow may be through the permeability of the formation, through vugs or pore spaces, through natural or manmade fractures. Additional flow paths may also exist such as an open hole wellbore, casing, perforation tunnels, slots, tubing, annuli, washouts, particulate packs, screens and completion/service/workover equipment. In some applications a mono-dispersed size may be desirable where in other applications a wide range of particle size distribution is employed.

The concentration of particulates can vary widely. Some of the slurries of the present invention may be mixed similar to drilling and drill-in fluids where particle loading can be measured in tens of pounds per barrel. Even higher loading may be used in concentrated slugs used in diverting where the concentration may be measured in tens of percent of volume fraction. On the other end of the concentration range will be those applications where a great deal of leakoff is required before a seal is formed. These treatments include applications of scale inhibitors and water injection profile control. In these cases, the particulate may be present in only a fraction by weight of the total slurry. As with sizing, one skilled in the art will use bridging and filtration theory to determine the concentration needed for a given application.

The base fluid used to make up the servicing fluid will vary greatly with the application of the fluid system. In some cases, water may serve as the base fluid. In other cases, an aqueous based fluid with salts or other soluble materials may be used. The addition of salts may be dictated by the need for formation compatibility and density. The decision to use brackish water, seawater and produced water may be made solely on the matter of convenience and economics given the location of the well site. Any number of non-aqueous fluids can be considered for use as the base fluid. Many of the oils, esters and solvents used to make drilling fluids and completion fluids can be used. Gases such as air, carbon dioxide and nitrogen may be used. Mixtures of these various fluids can be used in the form of foams and emulsions (both water external and water internal). No limitation need be placed on the choice of the base fluid other than it allow placement of the particulate material to the desired location without undue health, safety, environmental, compatibility or economic considerations.

Water soluble polymers may be added to the base fluid for the purpose of adding viscosity, particle suspension, friction reduction and filtration control. A number of water soluble polymers include, but are not limited to, guar, guar derivatives, cellulose derivatives such as hydroxyethylcellulose, biopolymers such as xanthan, diutan and succinoglycan, poly acrylamide, starch and polyvinyl alcohol/acetate and any and all other water soluble polymers that are known or may be developed. Additional polymers used for clay control and relative permeability modifiers may also be used as are known or which may be developed.

Under certain applications, the servicing fluid of the current invention may benefit from one or more additives that are commonly included in well servicing fluids. Examples of such additives are weighting agents, proppant, gravel, surfactants, acids, acid precursors, enzymes, chelating agents, microbes, oxidizers, fluid loss agents, pH buffers, friction reducers and biocides. One skilled in the art will recognize other additives useful in the current invention for certain applications or any contemplated application.

The temporary compacted material may further comprise fillers or coatings when desired. The function of the filler can be for any purpose, but examples include cost reduction, improved strength, density control and chemical release. The purpose of a coating may be to control degradation, improve storage, chemical release or to make the particles consolidate or tacky.

The compacted material composition may also comprise a solubility aid as contemplated in various well servicing and treatment, such as compacted benzoic acid with anhydrous sodium borate. Suitable solubility aids are known depending on the contemplated compactable organic acid employed. The solubility aid may be present in the compacted material in a range of from about 0.01% to about 70% by weight.

Thus, the preferred methods of this invention for use as a servicing fluid are basically comprised of the following steps: (a) a servicing fluid is prepared comprised of a base fluid and a temporary compacted material where the temporary compacted material is a compressed organic acid, (b) placing the servicing fluid into a subterranean formation such that a least a portion of the temporary compacted material is used to bridge or seal a flow path, (c) allowing at least a portion of the temporary material to dissolve, preferably at a contemplated rate.

As shown in FIG. 1 in one aspect of the invention the dissolution rate of a compacted acid, here benzoic acid, may be advantageously adjusted by the employ of a dissolution aid which is anhydrous sodium borate in this example. Depending on the conditions and applications contemplated such as subterranean formations encountered, particular dissolution rates will be preferred and adjusted accordingly.

Figure 2:
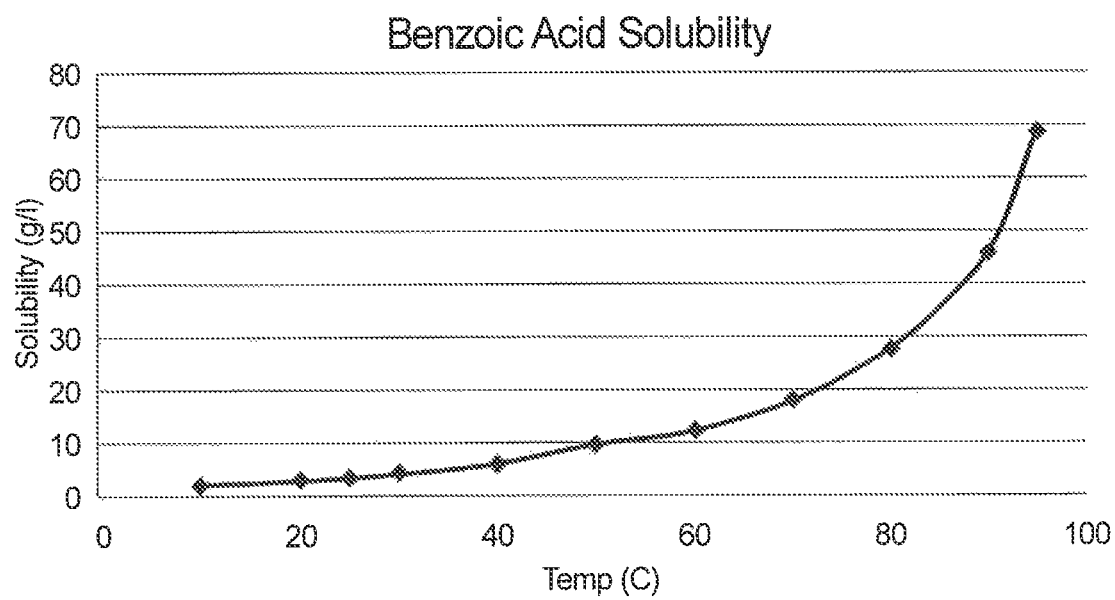
FIG. 2 is a graph showing an example of another aspect of the invention in the use of a compacted organic acid in various contemplated well servicing and treatment.

As shown in FIG. 2, an example of benzoic acid solubility at temperate increase is provided which increase in solubility can be advantageously employed with compacted material in accordance with this invention in various contemplated well servicing and treatment.

As shown in FIG. 3, an example of both benzoic acid and adipic and solubility, with temperature increase the solubility of adipic acid greatly increases relative to benzoic acid which provides a pronounced advantage in the use of compacted adipic acid particulate matter during considerable cool down, such as during pumping, with well temperature then resuming temperature increase, for example, under conditions of a higher temperature well.

Applications Examples

Water Flooding

Water injection and/or water flooding techniques in the oil industry are a well known methods used to increase pressure or to stimulate production, as normally only a fraction of the known reserves of oil in a reservoir can be extracted. In this method water and/or water in combination with pressurized $CO_2$ is injected into a reservoir which has the effect of supporting the pressure of the reservoir and to also sweep or displace oil in the reservoir and push it towards a production well. The present invention of temporary subterranean blocking a wide variety of small and larger fissures is advantageous in water flooding to provide the ability to temporarily block off subterranean formations from injected water and/or the $CO_2$ to provide enhanced ability to direct flow in pressure and flow vectors towards desired oil production.

Hydraulic Fracturing

In hydraulic fracturing techniques typically water and/or some type of down hole production fluid is mixed with particulate matter, such as sand and other production or treatment chemicals, and the mixture is injected usually at high pressure into a wellbore to create fractures along which fluid, such as gas, petroleum, etc. and water will migrate into. As pressure is removed from the well the small grains of particulate matter, usually called proppants, such as sand or aluminum oxide, hold the fractures open in the subterranean formation to better allow production flow. This well stimulation is known to greatly enhance well productivity. Again, in accordance with the present invention, certain subterranean formations may be temporarily blocked to better achieve a desired fracturing of subterranean strata for contemplative well production in a particularized area. The present invention may ideally provide the temporary blockage and pressure retention parameters under certain conditions and in certain contemplated for better efficiency in stimulation.

While the invention has been shown in only some of its forms and examples of applications, it should be apparent to those skilled in the art that it is not so limited, but susceptible to various changes and modifications without departing from the scope of the invention. Accordingly, it is appropriate that the appended claims be construed broadly and in a manner consistent with the scope of the invention.

What is claimed is:

1. A method of treating a subterranean formation comprising:
preparing a well servicing fluid comprised of a base fluid, a temporary compacted material wherein the temporary compacted material is a compacted organic acid and wherein the temporary compacted organic acid is compacted from powder or flake form to a larger particle at a pressure of approximately 3,500 psi to approximately 50,000 psi to alter solubility rate; placing the well servicing fluid into a subterranean formation; and allowing the temporary compacted material to gradually dissolve by an increase in temperature
wherein the compacted organic acid is adipic acid.

2. A method of claim 1 where the temporary compacted material is placed in the subterranean formation to influence the flow path of a wellbore or formation fluid.

3. A method of claim 1 where the temporary compacted material is placed in the subterranean formation such that the formation permeability is temporally altered.

4. A method of claim 1 where the temporary compacted material is placed in the subterranean formation where the wellbore configuration is altered.

5. A method of claim 1 where the compacted material further comprises a solubility aide.

6. A method of claim 5 where the solubility aide is anhydrous sodium borate.

7. A method of claim 1 where the temporary compacted material is a particle in the size range of 100 microns to 25 mm.

8. A method of claim 1 where the shape of the temporary compacted material is a shape other than round.

9. A method of claim 8 where the shape of the temporary compacted material is a rod, a cylinder, a disk, a plate, a filament, or has a cross section that is a square, rectangle, oval, triangle, or a composite shape of a combination of shapes.

10. A method of claim 5 where the solubility aide is present in the compacted particle in a range of 0.01% to 70% by weight.

11. A method of claim 1 where the temporary compacted material acts as a diverting agent, a fluid loss agent, a loss circulation agent, a filter cake, a bridge, a plug or a seal.

12. A method of claim 1 where the gradually soluble temporary compacted material is removed after the flow of production or injection fluids is started.

13. A method of claim 1 where the base fluid is water, a brine, seawater, brackish water, an oil, an ester, a solvent or any fluid used as a servicing fluid base fluid.

14. A method of claim 1 where the gradually soluble temporary compacted material may take from about 1 hour to about 2 months to dissolve.

15. A method of claim 1 where the servicing fluid comprising a temporary compacted material further comprises an organic acid powder or flakes.

16. A method of claim 1 where the servicing fluid comprising a temporary compacted material further comprises particles that can seal on the temporary compacted material.

17. A method of treating a subterranean formation comprising: preparing a well servicing fluid comprised of a base fluid, a temporary compacted material wherein the temporary compacted material is a compacted organic acid and wherein the temporary compacted organic acid is compacted from powder or flake form to a larger particle at a pressure of approximately 3,500 psi to approximately 50,000 psi to alter solubility rate; placing the well servicing fluid into a subterranean formation; and allowing the temporary compacted material to gradually dissolve by an increase in temperature
wherein the compacted material further comprises a solubility aide, and wherein the solubility aide is anhydrous sodium borate.

18. The method of claim 17, wherein the compacted organic acid is adipic acid.

* * * * *